US006883459B2

(12) United States Patent

Maki

(10) Patent No.: US 6,883,459 B2

(45) Date of Patent: Apr. 26, 2005

(54) FLAG RETRACTION AND EXTENSION DEVICE, SYSTEM AND METHOD

(76) Inventor: Immanuel P. Maki, 22 S. Loafing St., Hypoluxo, FL (US) 33462

( * ) Notice: Subject to any disclaimer, the term of this patent is extended or adjusted under 35 U.S.C. 154(b) by 0 days.

(21) Appl. No.: 10/423,614

(22) Filed: Apr. 25, 2003

(65) Prior Publication Data

US 2004/0025778 A1 Feb. 12, 2004

Related U.S. Application Data

(63) Continuation-in-part of application No. 10/045,775, filed on Jan. 10, 2002, now abandoned.

(51) Int. Cl.[7] ................................................ G01F 17/00

(52) U.S. Cl. ....................................................... 116/173

(58) Field of Search ................................. 116/173, 174, 116/175

(56) References Cited

U.S. PATENT DOCUMENTS

| | | | | | |
|---|---|---|---|---|---|
| 659,280 | A | | 10/1900 | Beaver | |
| 960,669 | A | | 6/1910 | Morgan | |
| 3,417,732 | A | | 12/1968 | Platt | |
| 3,587,520 | A | | 6/1971 | Miller | |
| 3,675,616 | A | * | 7/1972 | McInnis | 116/173 |
| 4,332,210 | A | * | 6/1982 | Lambert | 116/173 |
| 4,791,878 | A | | 12/1988 | Lewis | |
| 4,800,834 | A | | 1/1989 | Feng | |
| 4,896,623 | A | * | 1/1990 | Seibert et al. | 116/173 |
| 4,944,656 | A | * | 7/1990 | Feng et al. | 116/173 |
| 5,044,301 | A | | 9/1991 | Peters | |
| 5,983,825 | A | | 11/1999 | Nowak | |
| 2001/0010201 | A1 | | 8/2001 | Otterness | |

* cited by examiner

*Primary Examiner*—Christopher W. Fulton
*Assistant Examiner*—Travis Reis
(74) *Attorney, Agent, or Firm*—David P. Lhota, Esq.; Stearns Weaver Miller Weissler Alhadeff & Sitterson, P.A.

(57) ABSTRACT

A flag extension and retraction system comprising an outer pole having a slot for receiving a flag, inner pole rotatably disposed in the outer pole, flag affixed to the inner pole, structure for securing the flag to the inner pole, retraction system for guiding the flag into the outer pole slot, guide sleeve for assisting with the alignment of the flag with the outer pole slot, rotation system for rotating the flag into the outer pole, and elevator system for raising and lowering the inner pole. The instant invention may also include an adjustable base, a plurality of prongs on the outer pole for assisting with guiding the flag into the outer pole slot, a cap attached to the top of the inner pole in a manner that receives the prongs into the cap and electronic controls.

18 Claims, 18 Drawing Sheets

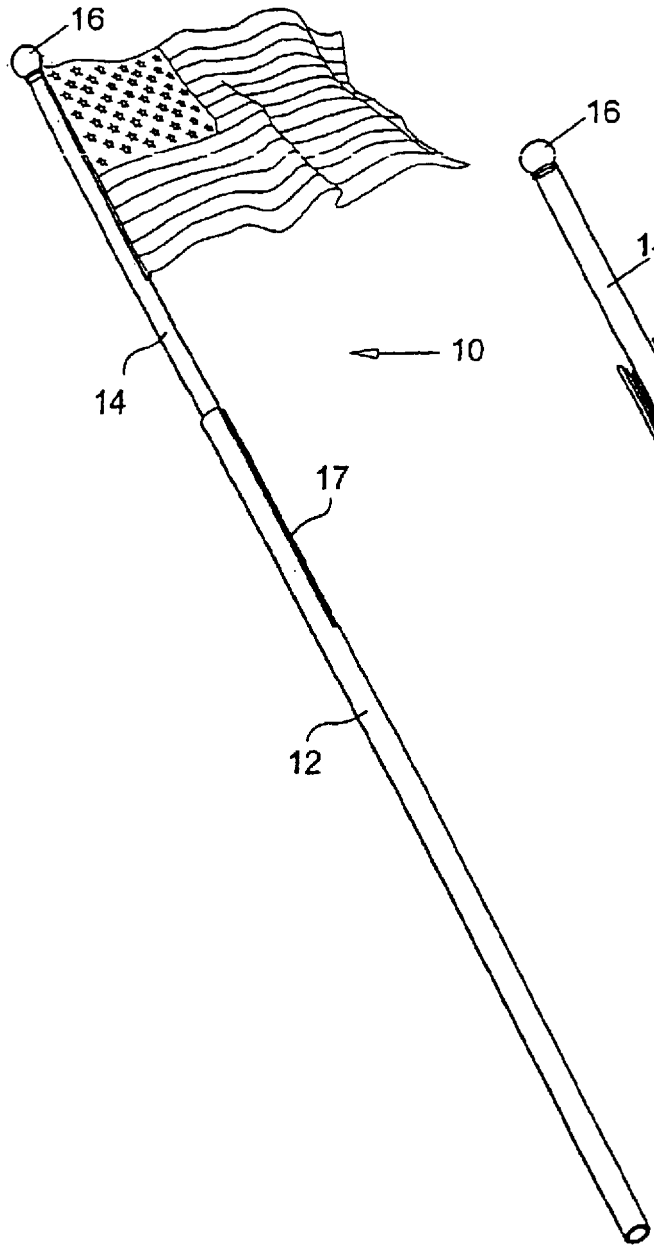
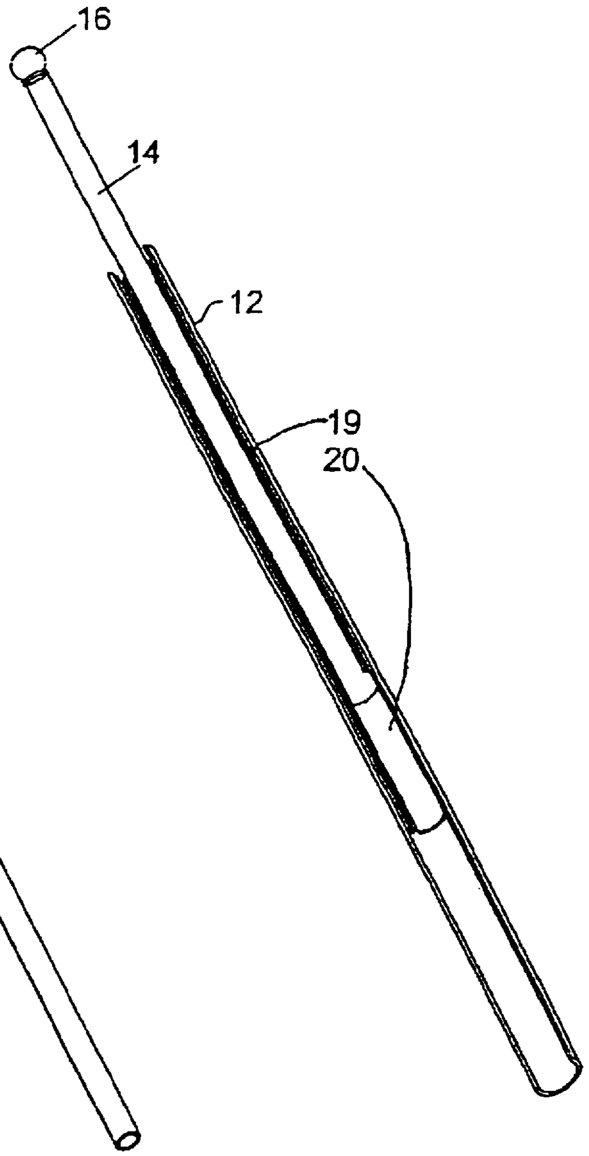
Fig. 6A
Fig. 6B

FLAG RETRACTION AND EXTENSION DEVICE, SYSTEM AND METHOD

CROSS REFERENCE TO RELATED APPLICATIONS

This application is a continuation-in-part of application Ser. No. 10/045,775 filed Jan. 10, 2002 now abandoned.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

The present invention relates generally to a novel flag pole and system, and more particularly, to a flag pole having a flag retracting and extension system for concealing the flag in the pole and extending it from the pole.

2. Description of the Background Art

Flag pole systems for raising and lowering flags are well known in the art. They normally employ exterior strings and ropes to raise and lower the flag up and down a flag pole. Flags are normally lowered for removal in bad weather, such as rain and snow storms, using strings and ropes that extend along the flag pole. Once removed, the flag should be properly folded and stored. Removing a flag, however, is not always convenient, especially when other preparations for a storm are required. In addition, flags are commonly left up regardless of the weather because of the process required to remove the flag and the frequency of storms. As conventional flag pole systems require the flag to be removed from the flag pole to conceal it from bad weather, flags are normally left on the flag pole. As a result, the life of the flag is drastically reduced. In addition, flags can wrap around the pole when extended and known systems employing ropes to raise and lower a flag are known to be unreliable. If a more convenient system were available for concealing a flag without removing it from the flag pole, the flag would last longer and realize the respect it deserves in inclement weather. Accordingly, there exists a need for a flag pole system that allows a flag to be stored and concealed without having to be removed from the flag pole. The instant invention addresses this need.

BRIEF SUMMARY OF THE INVENTION

Based on the foregoing, it is a primary object of the instant invention to provide a flag extension and retraction system that conceals a flag without having to remove the flag from the flag pole.

It is another object of the instant invention to provide a stringless flag extension and retraction system that conceals a flag without having to remove the flag from the flag pole.

It is also an object of the instant invention to provide a flag extension and retraction system that is convenient to use.

It is a further object of the instant invention to provide a flag retraction and extension system that protects and extends the life of a flag.

It is an additional object of the instant invention to provide a flag retraction and extension system that is cost-effective.

In light of these and other objects, the instant invention provides a flag extension and retraction system comprising an outer pole, inner pole, flag affixed to the inner pole, structure for securing the flag to the inner pole, retraction system for guiding the flag into the outer pole, guide sleeve, elevator system for extending and retracting the inner pole and flag and inner pole rotation system. The instant invention may also include an adjustable base. The inner pole includes at least one elongated slot for receiving the flag, which is secured thereto by a shaft or tension ring residing in the inner pole. The inner pole slidably and rotatably resides in the outer pole. The outer pole includes an elongated slot for receiving the flag and rotatably retracting the flag into the outer pole. The retraction system is at least partially disposed in the inner pole and comprises a flag guide, flag guide release, mediator bar mechanically joining the flag guide and flag guide release, flag guide release trigger and flag guide release counterpart. The flag guide resides proximal the lower inside edge of the flag and helps to direct the flag into the outer pole slot. The flag guide release extends and retracts the flag guide out of and into the inner pole when retracting and extending the inner pole, respectively. The flag guide provides rigidity for the lower end of the flag to facilitate receipt of the flag in the outer pole slot as the inner pole retracts into the outer pole. The guide sleeve is affixed to the inner wall of the outer pole and aligns the flag guide and flag with the outer pole slot when the inner pole is retracted into the outer pole by the elevator system. The inner pole is free to rotate inside the outer pole to prevent the flag from wrapping around the inner pole while in the extended position when the wind catches the flag. The inner pole may partially rotate inside the outer pole when extending and retracting it with the retraction system to facilitate proper alignment of the flag and flag guide with the guide sleeve, and hence the outer pole slot. The inner pole and flag are rotated by an inner pole rotation system, which comprises a handle, primary gear and secondary gear that rotate the inner pole clockwise and counterclockwise. The secondary gear translates movement of the handle to the primary gear, which causes rotation of the inner pole. To re-extend the flag, the inner pole is urged up through the upper opening of the outer pole by an elevator system.

The inner pole is extended and retracted by the elevator system that comprises a winch, wire, main wire bearing roller, upper wire bearing roller, lower support bearing, and wire attachment clamp. The winch is attached to the outer pole and is manipulated by a user actuating the handle to adjust the height of the inner pole. The wire is attached to the winch at one end and is fed into the outer pole, around the upper wire bearing roller and around the main wire bearing roller and secured at the opposite end to the outer pole by the wire attachment clamp. The lower support bearing is mounted above the main wire bearing roller and rotatably supports the lower end of the inner pole. As both ends are fixed, the lower support bearing and hence the inner pole are urged up and down when the winch is rotated back and forth. The winch locks in place to secure the inner pole in its desired position.

The placement of the inner pole with respect to the outer pole is important. Accordingly the instant invention may include a control window for determining proper placement of the inner pole inside the outer pole. The invention also includes a base with a vertically adjustable and tiltable platform and a protective knob at the top of the inner pole. The flag retraction and extension system of the instant invention is preferably installed so that the outer pole slot faces away from the wind direction. This ideal placement enhances the ability to align the flag with the outer pole slot.

In accordance with these and other objects, which will become apparent hereinafter, the instant invention will now be described with particular reference to the accompanying drawings.

BRIEF DESCRIPTION OF THE SEVERAL VIEWS OF THE DRAWINGS

FIG. 6A is a partial exploded view of the flag retraction and extension device, system and method of the instant invention illustrating the mating of the inner pole with the outer pole.

FIG. 6B is a cutaway view of the outer pole, inner pole and guide sleeve of the flag retraction and extension device, system and method of the instant invention.

DETAILED DESCRIPTION OF THE INVENTION

Figure 1:
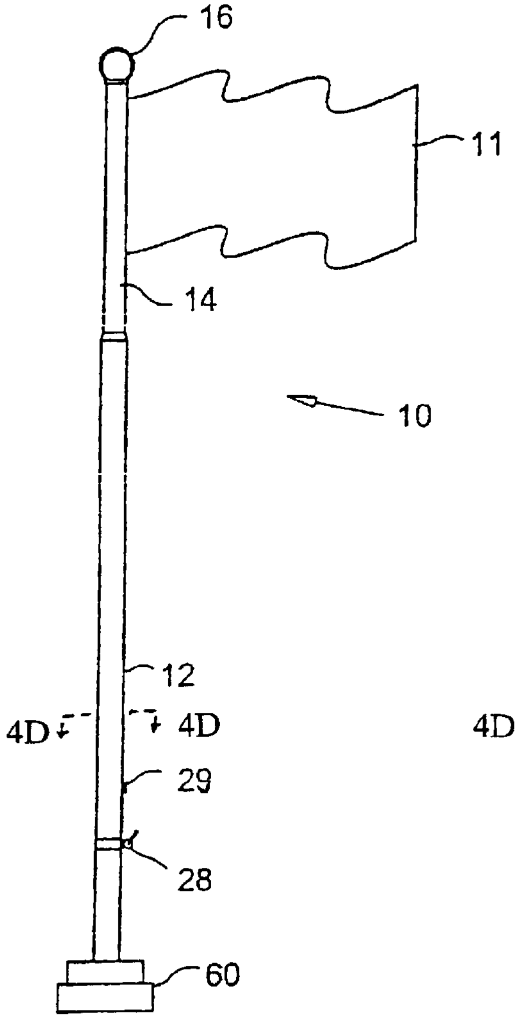
FIG. 1 is a front elevational view of the preferred embodiment of the flag retraction and extension device, system and method of the instant invention illustrating the flag in an extended position.
Figure 3C:
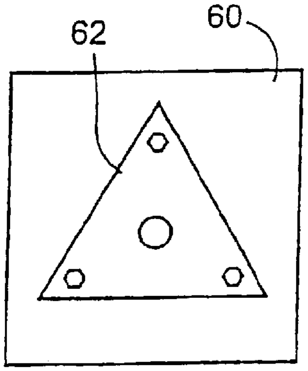
FIG. 3C is a top elevational view of the adjustable flag base of the flag retraction and extension device, system and method of the instant invention.
Figure 3A:
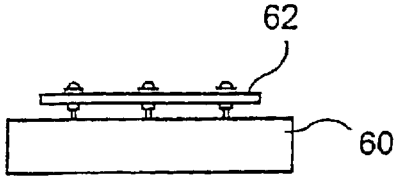
FIG. 3A is a side elevational view of the adjustable flag base of the flag retraction and extension device, system and method of the instant invention.
Figure 3B:
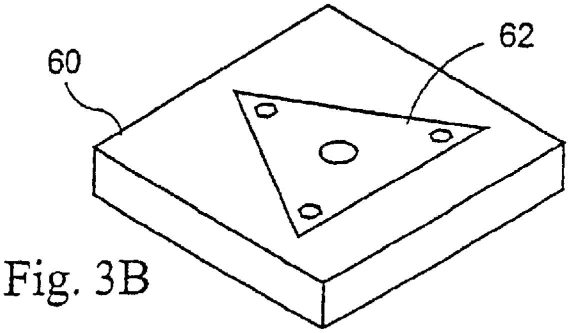
FIG. 3B is a perspective view of the adjustable flag base of the flag retraction and extension device, system and method of the instant invention.
Figure 4A:
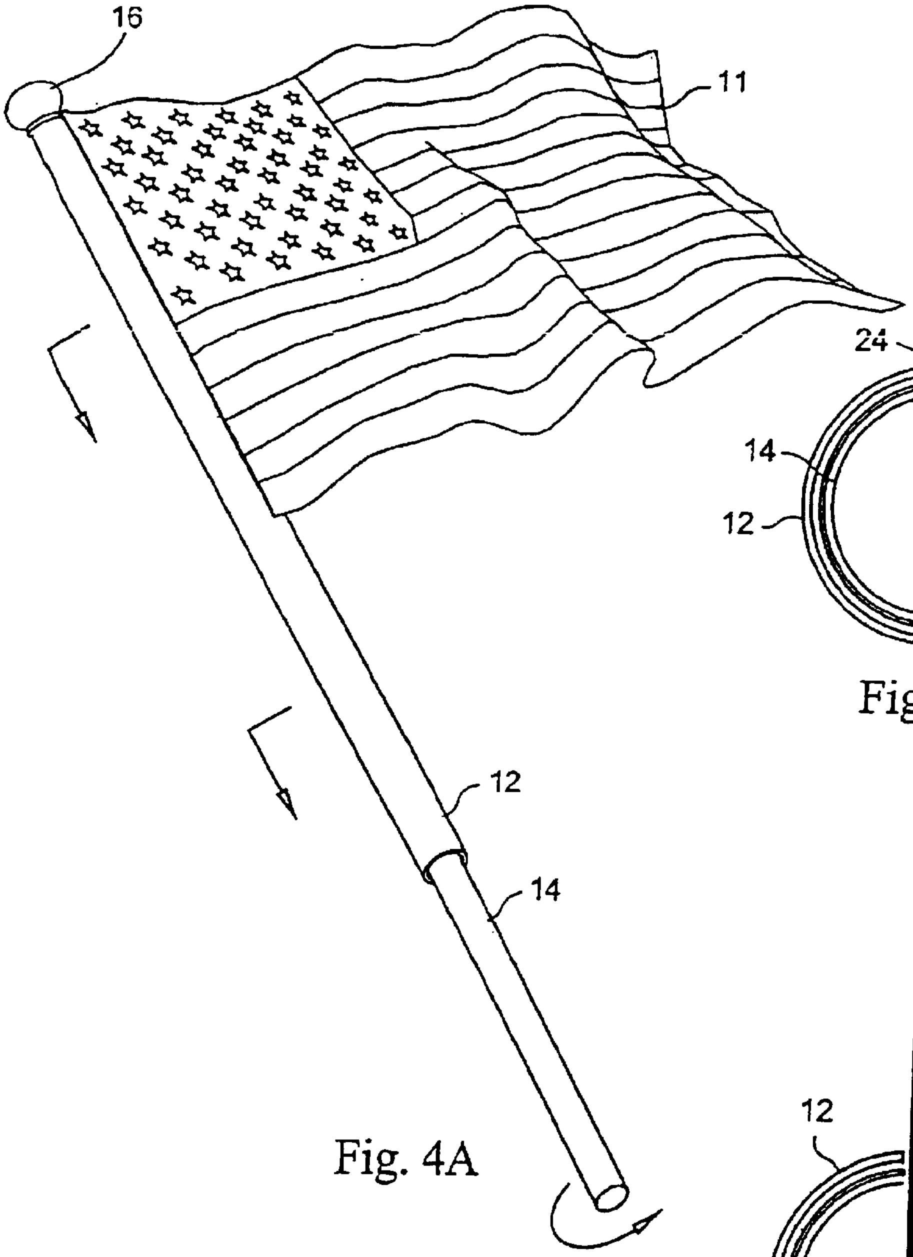
FIG. 4A is a partial perspective view of the flag retraction and extension device, system and method of the instant invention illustrating the movement of the inner pole within the outer pole.
Figure 4B:
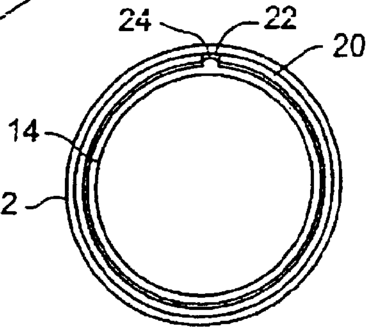
FIG. 4B is a cross-sectional view of the flag retraction and extension device, system and method of the instant invention taken along cross section lines 4A—4A of FIG. 4A.
Figure 4C:
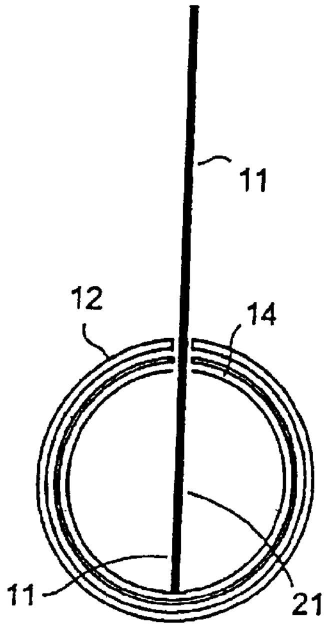
FIG. 4C is a cross-sectional view of the flag retraction and extension device, system and method of the instant invention taken along cross section lines 4B—4B of FIG. 4A.
Figure 7:
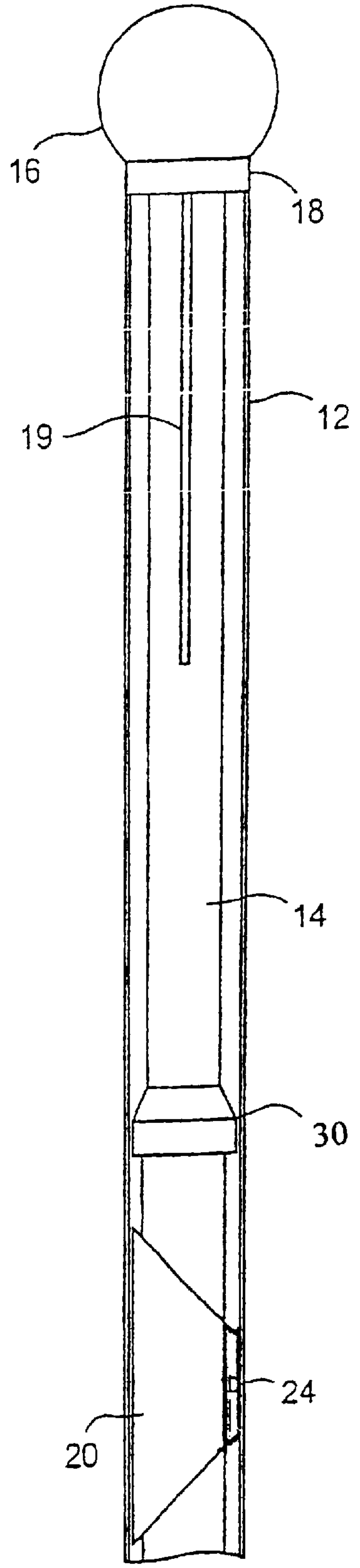
FIG. 7 is a partial cutaway view of the flag retraction and extension device, system and method of the instant invention illustrating the mating of the inner pole with the outer pole.
Figure 8A:
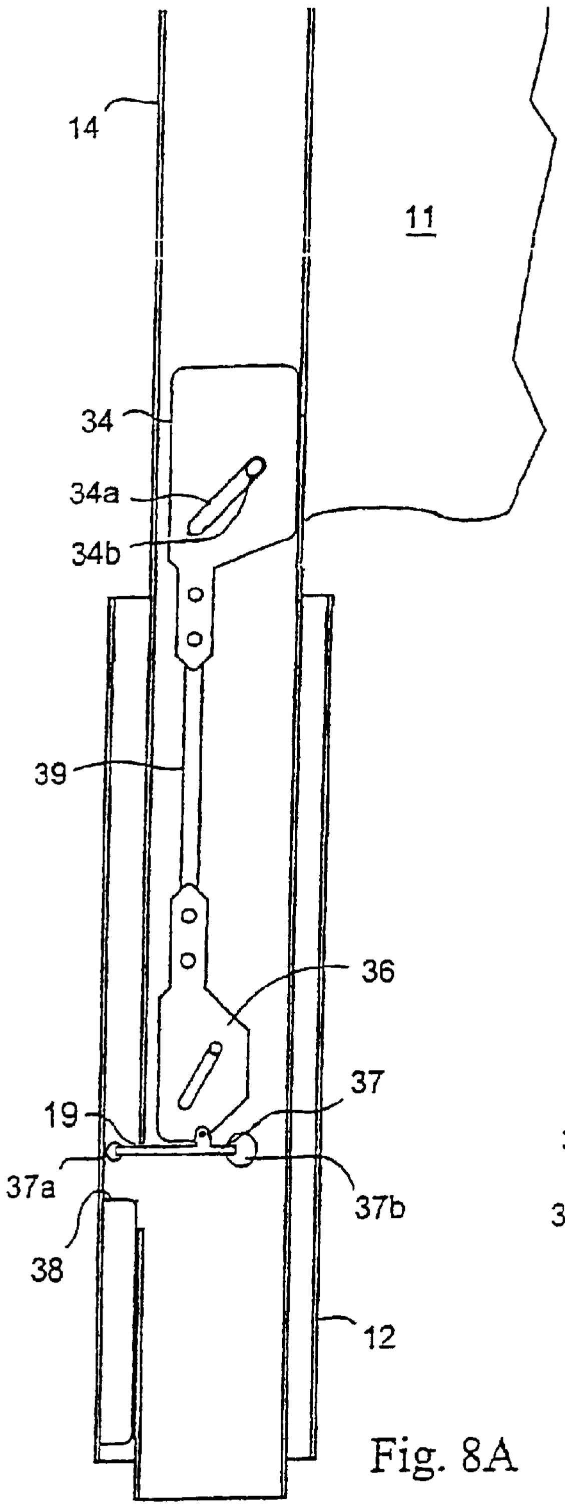
FIG. 8A is a partial cutaway view of the flag retraction and extension device, system and method of the instant invention illustrating the first embodiment of the flag retraction system in a first or extending position.
Figure 8B:
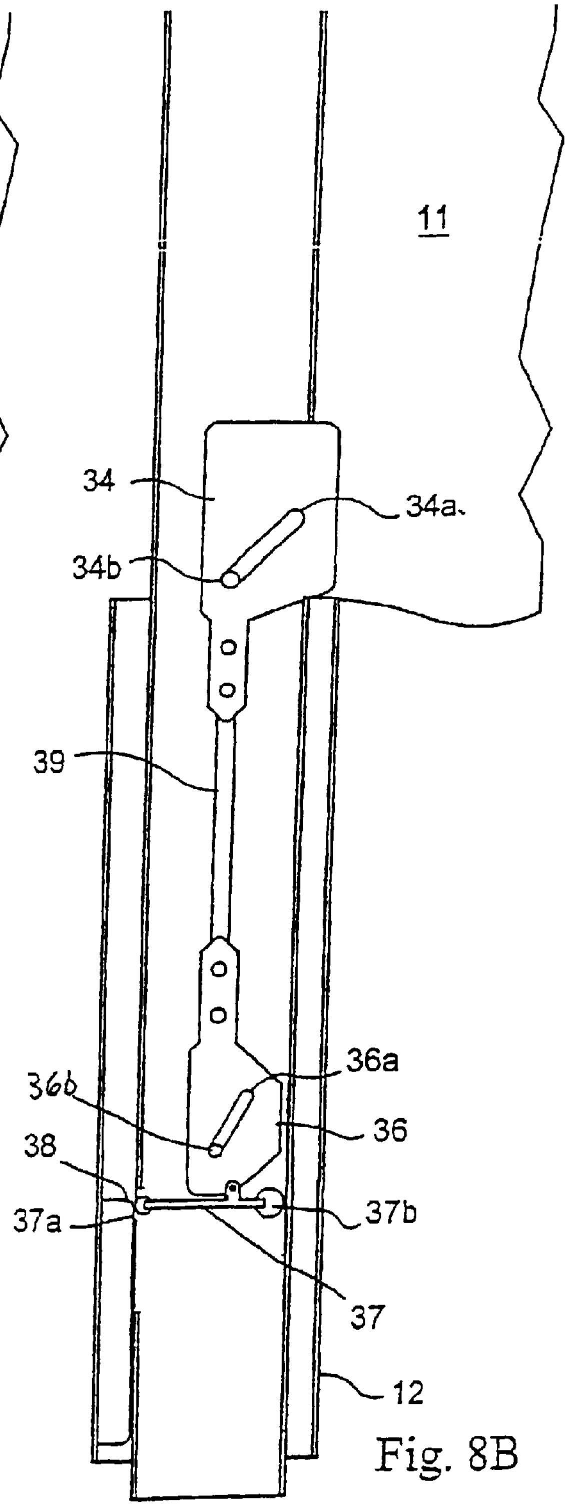
FIG. 8B is a partial cutaway view of the flag retraction and extension device, system and method of the instant invention illustrating the first embodiment of the flag retraction system in a second or retracting position.
Figures 8C, 8D, 8E:
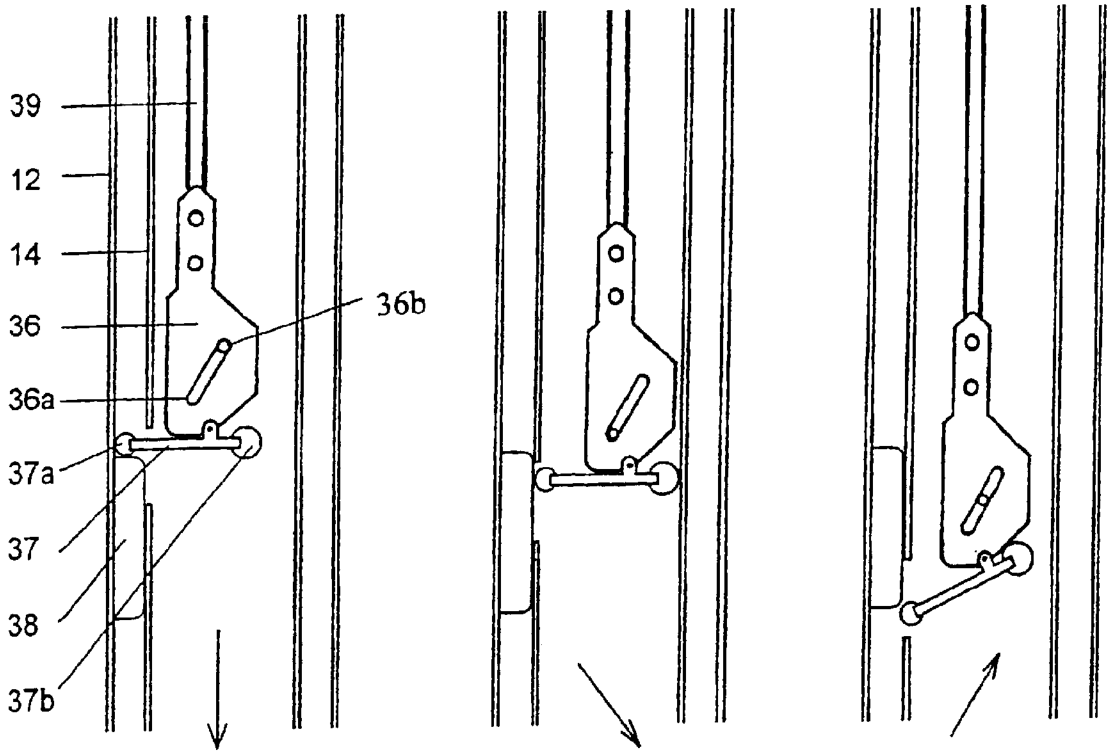
FIG. 8C is a partial cutaway view of the flag retraction and extension device, system and method of the instant invention illustrating the first embodiment of the flag retraction system in a position between the second and first positions.
FIG. 8D is a partial cutaway view of the flag retraction and extension device, system and method of the instant invention illustrating the first embodiment of the flag retraction system engaged with the flag guide release counterpart.
FIG. 8E is a partial cutaway view of the flag retraction and extension device, system and method of the instant invention illustrating the first embodiment of the flag retraction system below the flag guide release counterpart.
Figure 10:
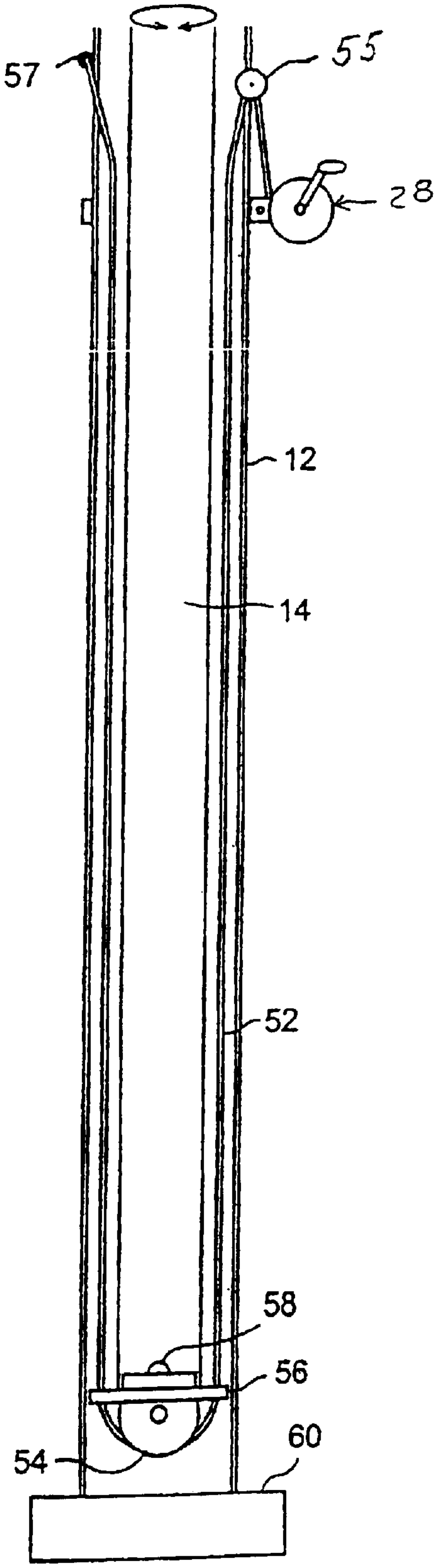
FIG. 10 is a partial cutaway view of the flag retraction and extension device, system and method of the instant invention illustrating the elevator system.

With reference to the drawings, FIGS. 1–19 depict the preferred and alternative embodiments of the instant invention, which is generally characterized by reference numeral 10. Referring to FIGS. 1–11C, the instant invention 10 provides a flag extension and retraction system generally comprising an outer pole 12, inner pole 14, retraction system 34–39 or 40–47 for guiding a flag 11 into the outer pole 12, guide sleeve 20, elevator system 28, 52–58 for raising and lowering the inner pole 14 and inner pole rotation system 29 for rolling up the flag inside the outer pole 12. The instant invention may also include an adjustable base 60, 62, as shown in FIGS. 3A–3C. With reference to FIG. 1, the flag 11 is shown in an extended position, wherein the winch 28 is also positioned in the extended position. The winch 28 moves the inner pole 14, and hence the flag 11, up and down, depending on the desired position, for extending and retracting the flag 11. The inner pole 14 includes at least one elongated slot 19 for securing the flag 11 and facilitating the extending and retracting of the retraction system's flag guide, as shown in FIGS. 7, 8A and 8B. With reference to FIG. 4C, one edge of the flag 11 is secured inside the inner pole 14 to a shaft or tension ring 21, which are also secured inside the inner pole 14. The inner pole 14 slidably and rotatably resides in the outer pole 12, as illustrated by FIGS. 4A–4C. The outer pole 12 includes an elongated slot 17 for receiving the flag 11 as it is rotatably retracted into the outer pole 12 by the inner pole rotation system 29, as shown in FIGS. 4A–4C, 5 and 6. The slot 17 should be at least thirty-three percent longer than the height of the flag 11 to provide ample clearance for receiving and wrapping the flag around the inner pole 14 in a manner that reduces and alleviates chafing or snagging of the flag 11 along its edges. The outer pole slot 17 and inner pole slot 19 may be laminated or coated with a non-stick substance to further prevent chafing and snagging of the flag 11. The flag 11 may also have an interior corner edge that is laminated or comprises a plastic like coating or sleeve to alleviate chafing or snagging of the flag.

Figure 2:
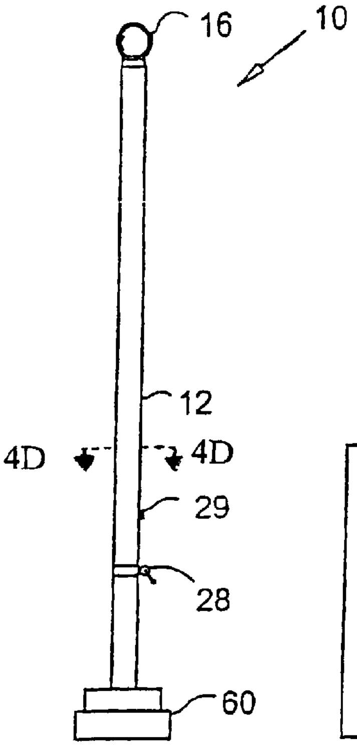
FIG. 2 is a front elevational view of the preferred embodiment of the flag retraction and extension device, system and method of the instant invention illustrating the flag in a retracted position.
Figure 4D:
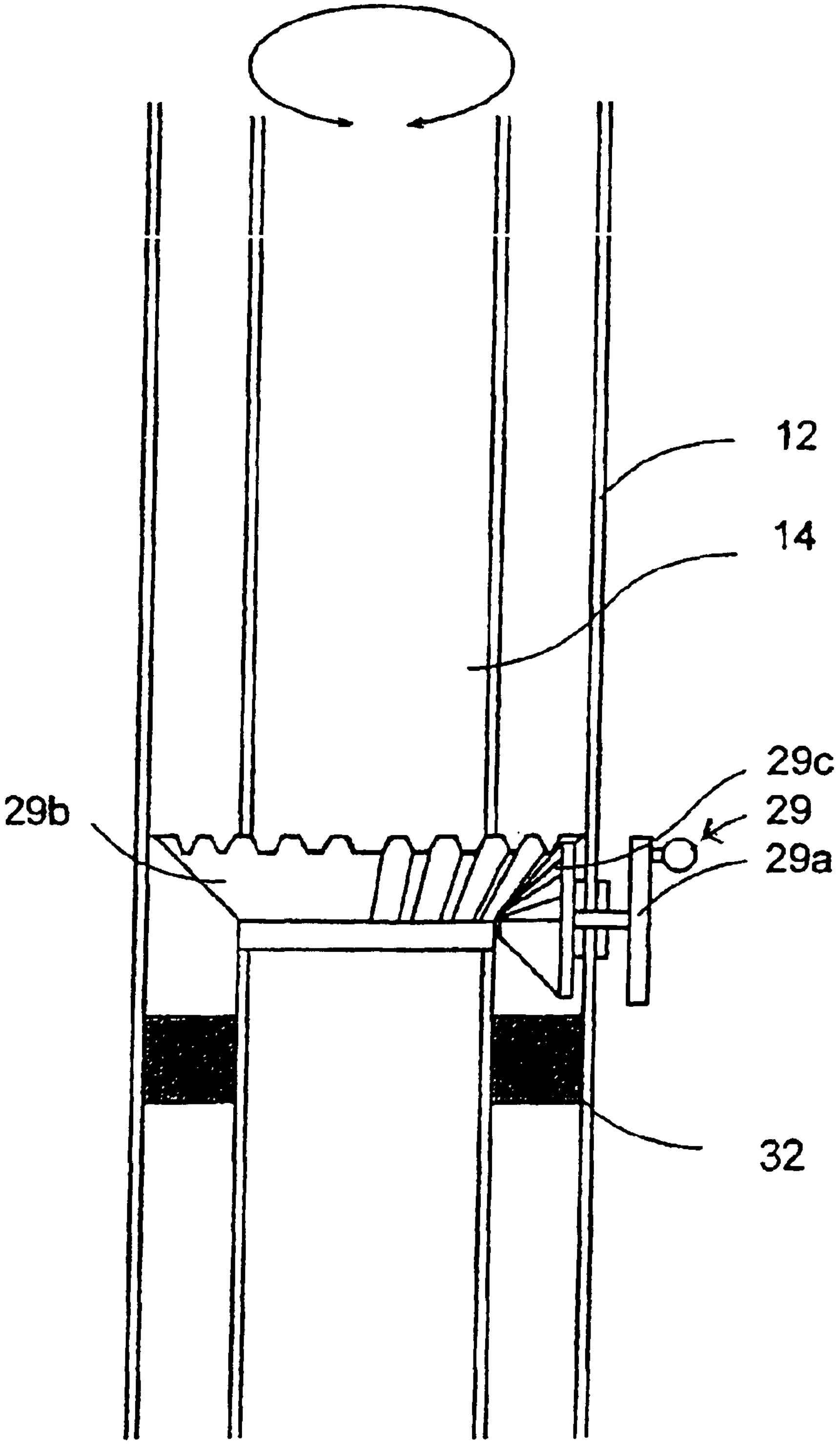
FIG. 4D is a partial cutaway view and cross-sectional view of the outer pole, inner pole and inner pole rotation system of the flag retraction and extension device, system and method of the instant invention taken along cross-section lines 4D—4D of FIGS. 1 and 2.
Figure 5:
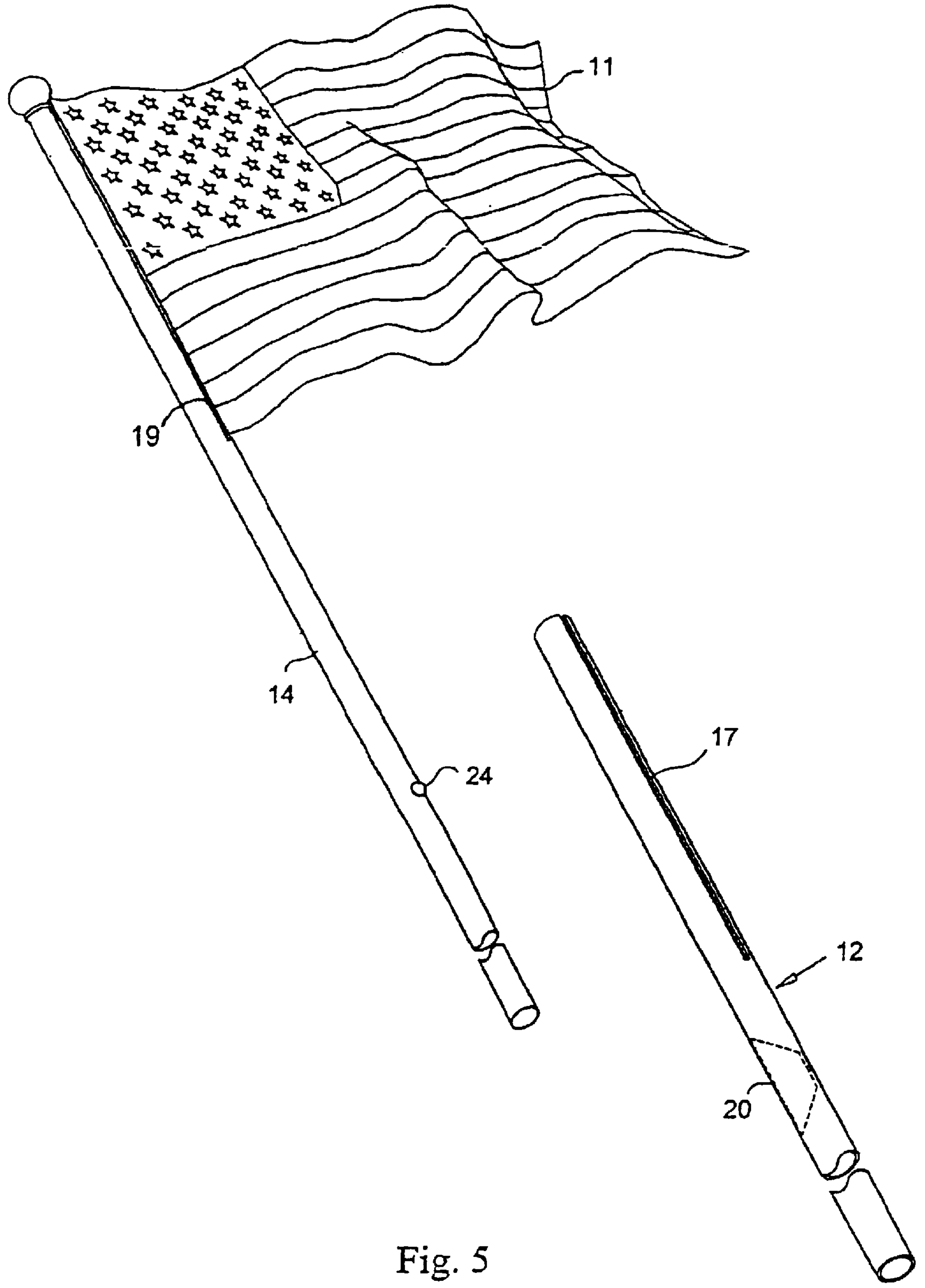
FIG. 5 is a partial exploded view of the flag retraction and extension device, system and method of the instant invention illustrating outer pole and inner pole unassembled and showing the guide sleeve in phantom.

With reference to FIG. 2, in one embodiment the flag 11 may be guided into the outer pole's slot 17 by a retraction system when the inner pole 14 is lowered into the outer pole 12 by a winch controlled elevator system. The winch 28 provides a user interface to the elevator system as more fully described herein. Once the inner pole 14 and flag 11 are fully retracted, the flag 11 is rolled into the outer pole 12 around the inner pole 14 by turning the handle/knob 29A of the inner pole rotation system. The inner pole rotation system 29 comprises a turn knob 29A, primary gear 29B and secondary gear 29C, as shown in FIG. 4D. The secondary gear 29C translates rotational movement of the turn knob 29A to the primary gear 29B, which causes rotational movement of the inner pole 14. The flag pole system 10 includes at least one support bearing and preferably a plurality of support bearings for preventing the inner pole 14 from bending inside the outer pole 12. The medium support bearing 32 is shown in FIG. 4D, and provides lateral support along the mid-section of the inner pole 14. In an alternative embodiment, the upper support bearing 30 comprises a sliding bearing and provides support to prevent bending when the inner pole is extended and retracted, as shown in FIGS. 7 and 9.

With reference to FIGS. 8A–8E and 9, the retraction system is at least partially disposed in the inner pole 14 and comprises a flag guide 34, flag guide release 36, mediator bar 39 mechanically joining the flag guide 34 and flag guide release 36, flag guide release trigger 37, and flag guide release counterpart 38. The retraction system actuates the flag guide 34 or 42 through the inner pole slot 19, depending on whether the flag is being extended or retracted. The flag guide 34 resides proximal the lower inside edge of the flag 11 to direct the flag 11 into the outer pole slot 17 and prevents premature wrapping of the flag around the inner pole 14 as it is retracted. The flag guide 34 provides rigidity for the lower end of the flag to facilitate receipt of the flag in the outer pole slot as the inner pole 14 retracts into the outer pole 12. When the flag is being retracted, the flag guide 34 is urged out through the inner pole's slot 19 to assist in guiding the flag 11 into the outer pole's slot 17. Once retracted, the flag guide 34 is retracted back through the inner pole slot 19. The mediator bar 39 transfers movement of the flag guide release 36 to the flag guide 34, respectively.

With reference to FIGS. 8A–8E, the first embodiment of the flag retraction system is shown. The flag guide 34 and flag guide release 36 each have a guide slot 34*a*, 36*a* defined at a predetermined angle and stationary guide pin 34*b*, 36*b* over which the flag guide 34 and flag guide release 36 traverse, respectively. The flag guide 34 and flag guide release 36 comprise substantially flat plates. The flag guide 34 comprises two plates 34 that sandwich the lower inside edge of the flag 11. The flag 11 is able to move freely between the flag guide plates 34 when retracting and extending the flag 11. With reference to FIG. 8A, in the extended or idle position the flag 11 penetrates the flag guide plates 34 a distance equal to the distance between the outer surface of the inner pole 14 and the inner surface of the outer pole 12. With reference to FIG. 8B, when the flag 11 is being retracted it penetrates the flag guide plates 34 a distance equal to the distance between the outer surface of the inner pole 14 and the outer surface of the outer pole 12. The retraction system includes a flag release trigger bar 37 comprising a first pin 37*a* and second pin 37*b* at opposite ends of the trigger bar 37. When the inner pole 14 is moved downward, the flag release trigger bar's 37 first pin 37*a* engages the flag release counterpart 38. This causes the guide release 36 and flag guide 34 to shift over in a manner that urges the flag guide 34 out through the inner pole slot 19. To further effectuate this toggle action, one pin may be heavier in weight than the other pin. For instance, pin 37*b* is preferably heavier than pin 37*a* to cause the trigger bar 37 to reestablish horizontal when extending the inner pole 14. When extending the inner pole 12 and flag 11, the first pin 37*a* of the flag release trigger bar 37 is disengaged from the counterpart 38 causing the flag guide 34 and flag guide release 36 to shift back to the first position and the flag guide 34 to retract back into the inner pole 14.

Figure 9:
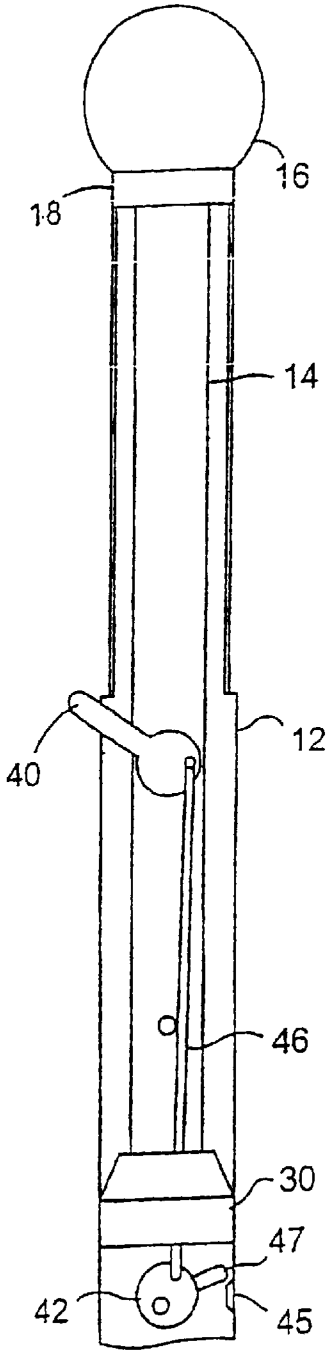
FIG. 9 is a partial cutaway view of the flag retraction and extension device, system and method of the instant invention illustrating the second embodiment of the flag retraction system.

With reference to FIG. 9, the second embodiment of the retraction system is at least partially disposed in the inner pole 14 and comprises a flag guide 40, flag guide release 36, mediator bar 39 mechanically joining the flag guide and flag guide release, flag guide release trigger 37, and flag guide release counterpart 38. The flag guide 40 and flag guide release 42 rotate in a manner that extends and retracts the flag guide 40 through the inner pole slot 19 as the trigger bar 47 engages the flag release counterpart 45. The flag guide 40 resides proximal the lower inside edge of the flag 11 and comprises a substantially flat cam-like plate having a projecting trigger bar 47. The trigger bar 47 extends radially outward from the flag guide release 42 and the flag release counterpart extends radially inward from the interior surface of the outer pole 12. When retracting the inner pole 14, the flag guide release trigger bar 47 engages the counterpart 45 causing the flag guide release 42 to rotate counterclockwise. This rotation is transferred to the flag guide 40 by the mediator bar 46, urging the flag guide 40 out of the inner pole's slot 19 as the flag guide 40 is rotated. When the inner pole 12 is extended, the guide release 42 rotates clockwise causing the flag guide 40 to retract back through the inner pole's slot 19. To effectuate the clockwise movement, an additional or modified counterpart may be employed or the flag guide release 42 may be spring-loaded or coiled. The upper support bearing 30 facilitates straight vertical movement of the inner pole 14 in the outer pole 12 with substantially no rocking.

Figure 12:
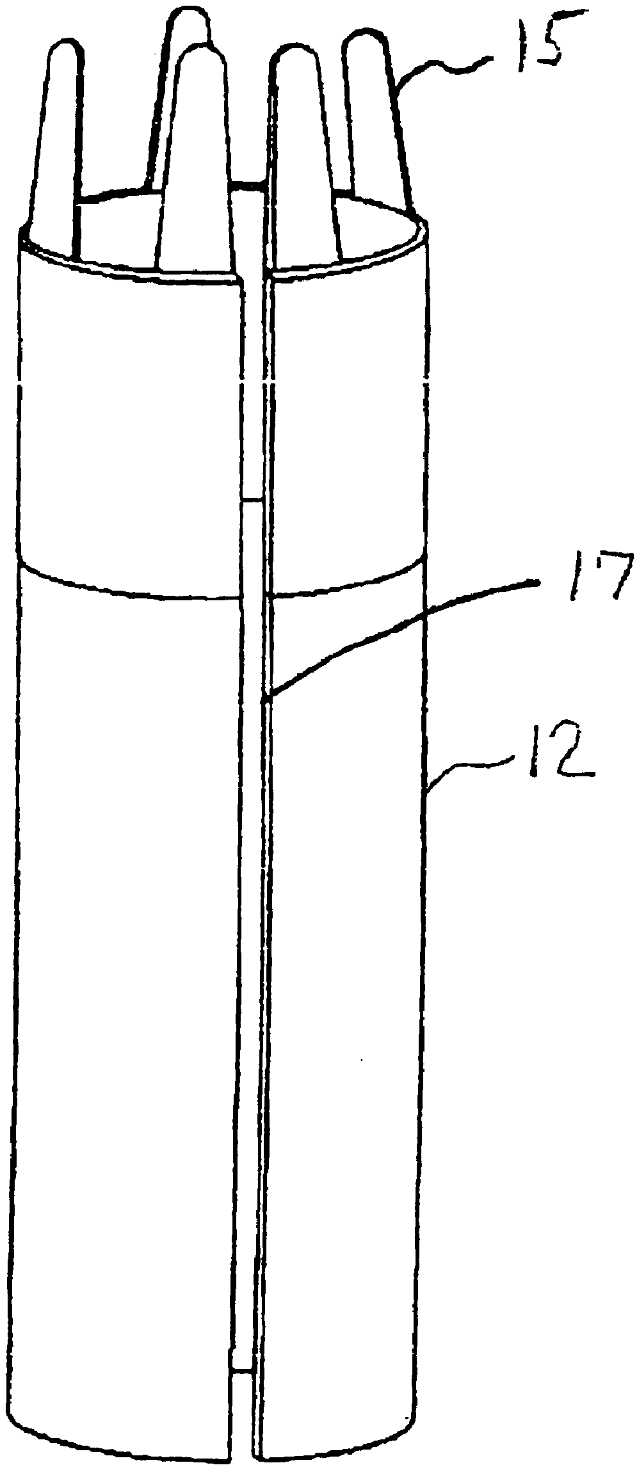
FIG. 12 is a partial perspective view of the inner pole and securing prongs of the instant invention.

In another embodiment, the flag system 10 may include a plurality of rigid prongs 15, such as in the form of a cap to help guide the flag 11 into the outer pole slot 17, as shown in FIG. 12. The cap or prongs 15 are affixed to the top of the outer pole 12 and reside inside the protective knob 16 when the inner pole 14 is retracted into the outer pole 12. The protective knob 16 is affixed to the top of the inner pole 14 in a manner that facilitates receipt of the prongs 15. In another alternative embodiment, the lower inside corner edge of the flag 11 may be rigid enough to enter the outer pole slot 17 with minimal structural assistance.

Figure 11A:
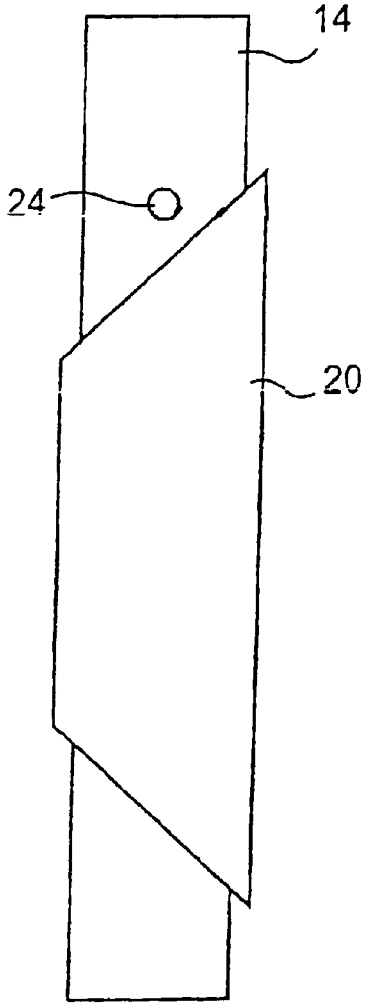
FIG. 11A is a side elevational and partial view of the guide sleeve and corresponding section of the inner pole in accordance with the flag retraction and extension device, system and method of the instant invention.
Figure 11B:
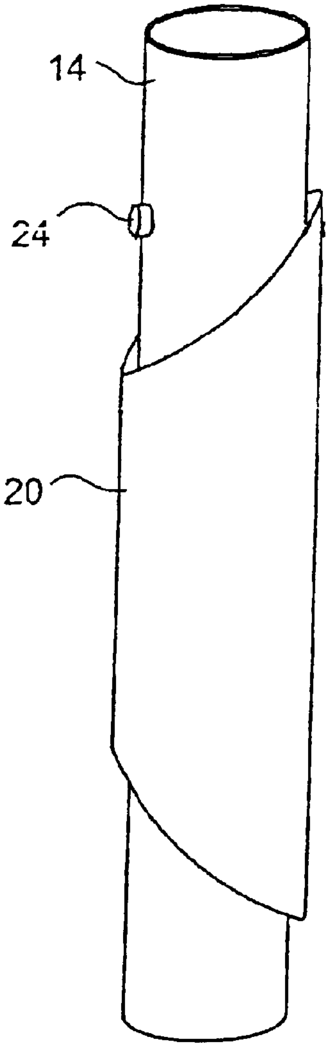
FIG. 11B is a perspective and partial view of the guide sleeve and corresponding section of the inner pole in accordance with the flag retraction and extension device, system and method of the instant invention.
Figure 11C:
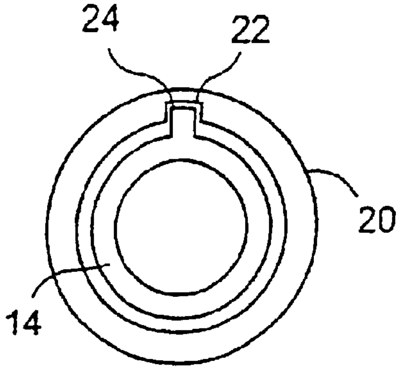
FIG. 11C is an end view of the guide sleeve and corresponding section of the inner pole as shown in FIGS. 11A and 11B.

With reference to FIGS. 11A–11C, the instant invention 10 includes a guide sleeve 20 that aligns the flag 11 and flag guide 24 with the slot 22 in the outer pole 12. The sleeve 20 is affixed to the inner wall of the outer pole 12 and aligns the flag guide 34 or 40 and flag 11 with the outer pole slot 17 when the inner pole 14 is retracted into the outer pole 12 by the elevator system. The inner pole 14 may partially rotate inside the outer pole 12 when extending and retracting it with the retraction system to facilitate proper alignment of the flag 11 and guide sleeve 20 with the outer pole slot 17. The inner pole 14 and flag 11 are rolled by an inner pole rotation system 29, which comprises a handle 29A, primary gear 29B and secondary gear 29C that rotate the inner pole 14 clockwise and counterclockwise. The secondary gear 29C translates movement of the handle 29*a* to the primary gear 29B, which causes rotation of the inner pole 14. To re-extend the flag, the inner pole 14 is urged up through the upper opening of the outer pole 12 by the elevator system.

The inner pole 14 is extended and retracted by the elevator system. The elevator system preferably raises the inner pole 12 a height that is at least two (2) times the height of the flag to provide ample clearance for the flag in the extended position. The elevator system comprises a winch 28, wire 52, main wire bearing roller 54, upper wire bearing roller 55, lower support bearing 56, and wire attachment clamp 57. The winch 28 is attached to the outer pole 12 and is manipulated by a user actuating the handle 29A to adjust the height of the inner pole 14. The winch 28 includes a brake, such as a spring-loaded pin or releasable latch, to hold the inner pole at a desired position. The wire 52 is attached to the winch 28 at one end and is fed into the outer pole 12, around the upper wire bearing roller 55 and around the main wire bearing roller 54 and secured at the opposite end to the wire attachment clamp 57. As both ends of the wire 52 are secured, the height of the inner pole 14 is adjusted by turning the winch 28. The upper wire guide 55 comprises a pulley or similar rotational support mechanism. The upper wire bearing roller 55 is affixed to an inner surface of the outer pole 12. The height of the upper wire bearing roller 55 may be adjusted to change the vertical distance that the inner pole 14 is moved. The lower support bearing 56 is mounted to the main wire bearing roller 54, rotatably supports the lower end of the inner pole 14 and prevents rocking of the inner pole 14. At least one fastener 58, such as a nut and bolt, may be used to secure the lower support bearing 56 to the inner pole 14. As both ends are fixed, the lower support bearing 56 and hence the inner pole 14 are urged up and down when the winch 28 is rotated back and forth. The winch 28 locks in place to secure the inner pole in its desired position.

The components of the instant invention preferably comprise aluminum, stainless steal or some other known material that does not rust. In an alternative embodiment, the elevator system, particularly the winch 28, and the inner pole rotation system 29 may be electronic and electronically controlled. The electronic control of these components may be accomplished by a remote control or automatically, such as by a timer or moisture sensor.

Figure 13:
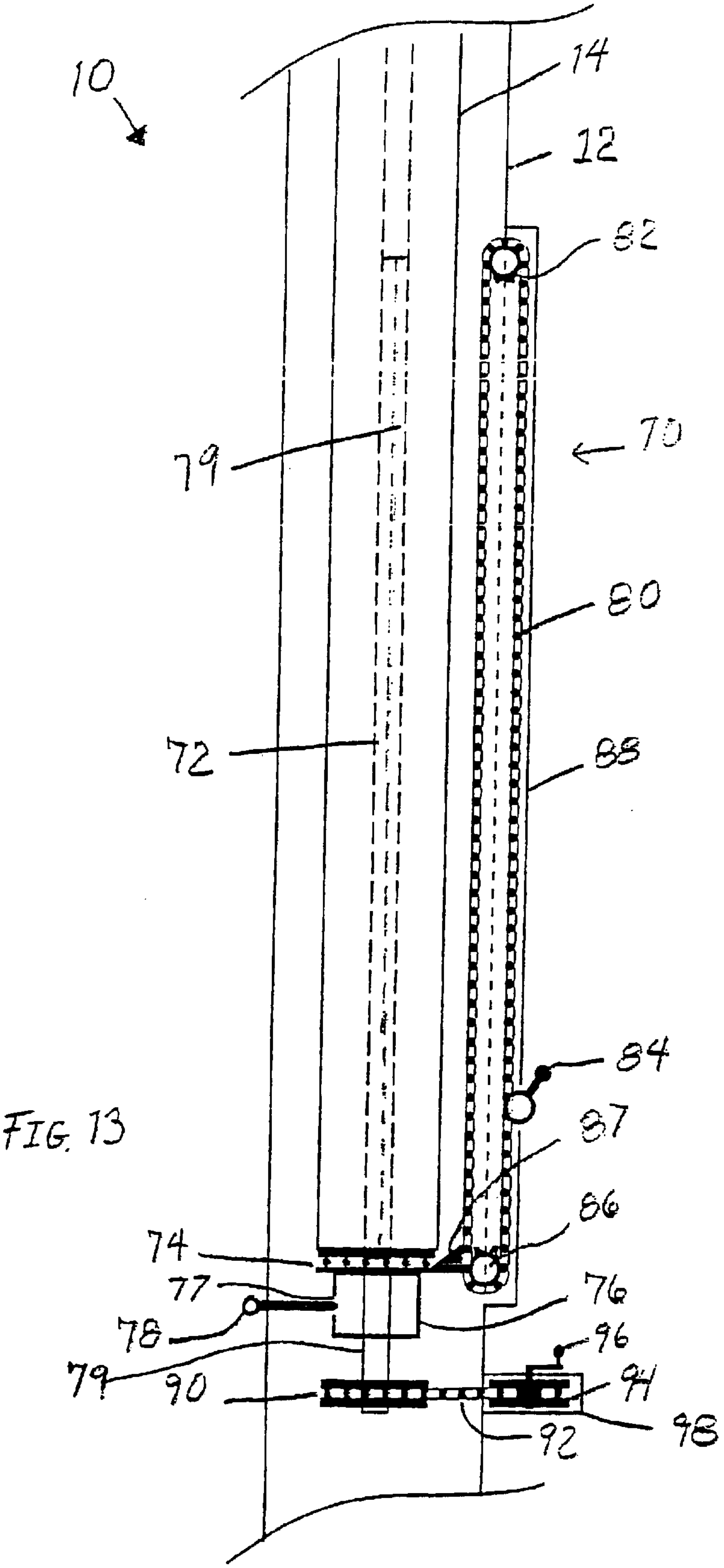
FIG. 13 is a cutaway elevational view of an alternative embodiment of the instant invention illustrating an alternative retraction system.
Figure 14:
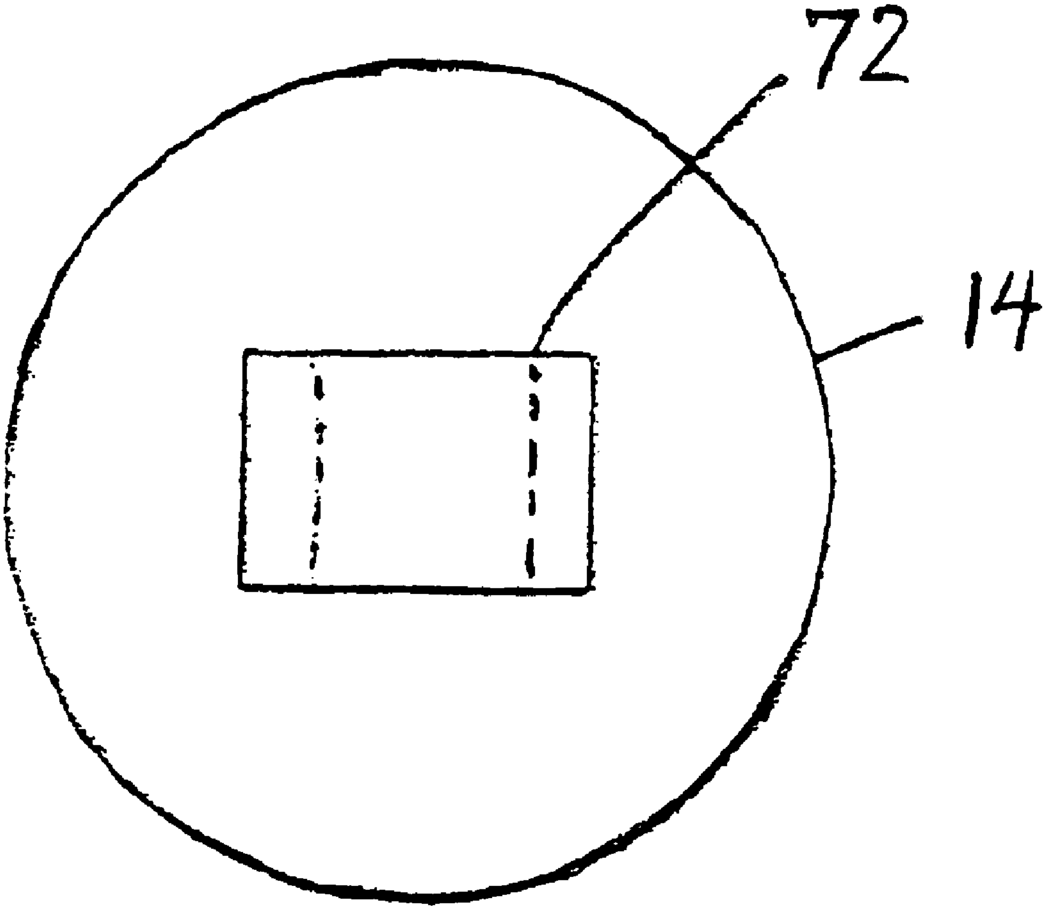
FIG. 14 is an end view of the drive shaft and inner pole in accordance with the alternative embodiment of the instant invention shown in FIG. 13.

In another embodiment, the instant invention 10 comprises a chain driven elevator system 70 to raise and lower the flag, locking mechanism 78, 76 and alternative rotation system 72, 90–98, as shown in FIGS. 13 and 14. The chain driven system 70 comprises a chain 80, upper gear 82, lower gear 86, crank 84, cam 87, open ring 74, piston 76 and drive box 88. The drive box 88 comprises a side compartment for at least partially enclosing and protecting the chain driven system 70. The drive box 88 may be formed with or attached to the outer pole 12 and resides in alignment over a slot formed in the outer pole 12 for raising and lowering the inner flag pole 14. The chain 80 is wrapped around the gears 82, 86. The upper and lower gears 82, 86 have teeth that secure and guide the chain 82 when the crank 84 is actuated. The crank 84 comprises a chain moving mechanism. The crank 84 moves the chain 80 up and down to lower and extend the inner pole 14. The gears 82 and 86 are mechanically joined by the chain 80. The chain 80 preferably travels in a vertical path in the rail and arches over the upper gear 82 and lower gear 86. The chain 80 travels around the upper gear 82 and lower gear 86 and causes the inner pole 14 to be lowered The open ring 74 is installed over the bearing that is attached to the inner pole. The ring can be detached with the entire elevator system 70 and installed on another flag pole. The open ring 74 and piston 76 support, secure and urge the inner pole 14 up and down when the chain 80 is moved. The open ring 74 has an opening for receiving the cam 87. The cam 87 is preferably permanently secured to the chain rail and directly or indirectly engages the drive piston 74 and inner pole 14 system through the ring 74 opening. The drive shaft 72 slidably resides in the inner pole 14 and may have a side slot 79 that faces the inner pole 14 and extends from the upper gear 82 to the lower gear 86 to receive, stabilize and guide the cam 87. When the crank 84 is actuated in one direction the chain 80 rotates in a corresponding direction causing the cam 87 and hence the inner pole 14 to rise resulting in the flag 11 being extended. When the crank 84 is actuated in an opposite direction the cam 86 is lowered retracting the inner pole 14 and flag 11 into the outer pole 12.

With reference to FIG. 13, the alternative rotation system comprises a drive shaft 72, drive gear 90, drive belt or chain 92, crank gear 94 and handle 96 at least partially enclosed in a gear box 98. The rotating mechanism is preferably installed near the bottom of the system 10. With reference to FIG. 14, the drive shaft 72 comprises a rectangular or square shaft that is securely and slidably inserted in the inner pole 14 and secured at the free end to the drive gear 90. Alternatively, the drive shaft 72 may comprise an alternative shape that is able to impart rotational movement on a concentrically disposed pole. Accordingly, when the drive shaft 72 is rotated it rotates the inner pole 14. When the inner pole 14 is raised or lowered it slides along the drive shaft 72. The length of the drive shaft 72 dictates the height that the inner pole 14 may be raised. The handle 96 is connected to the crank gear 94 by an axle and the drive belt or chain 92 wraps around the drive gear 90 and crank gear 94 to impart rotational movement on the gears when the handled 96 is actuated. When rotated, the drive gear 90 rotates the drive shaft 72, which rotates the inner pole 72 causing the flag to wrap around the inner pole 14 inside a flag chamber 83.

The inner pole 14, and hence flag 11, are secured at a desired height or in the retracted position by a locking mechanism that secures the crank 84. Another locking mechanism 78 insures proper alignment of the inner pole 14 when lowering the flag 11. The locking mechanism 78 comprises a pin or key 78 that removably engages an aperture or slot 77 in the piston 76. The outer pole 12 has an aperture for receiving the pin 78, which extends outside the outer pole 12. When lowering the inner pole 14 and flag 11, the locking pin 78 insures that the flag 11 and inner pole 14 are lowered into an appropriate position with reference to the outer pole 12 to enable the flag to be rolled into the flag chamber 83. The flag 11 is rolled into the flag chamber 83 by actuating the handle 96 to rotate the inner pole 14. The inner pole 14 may be raised and rotated simultaneously.

Figure 15:
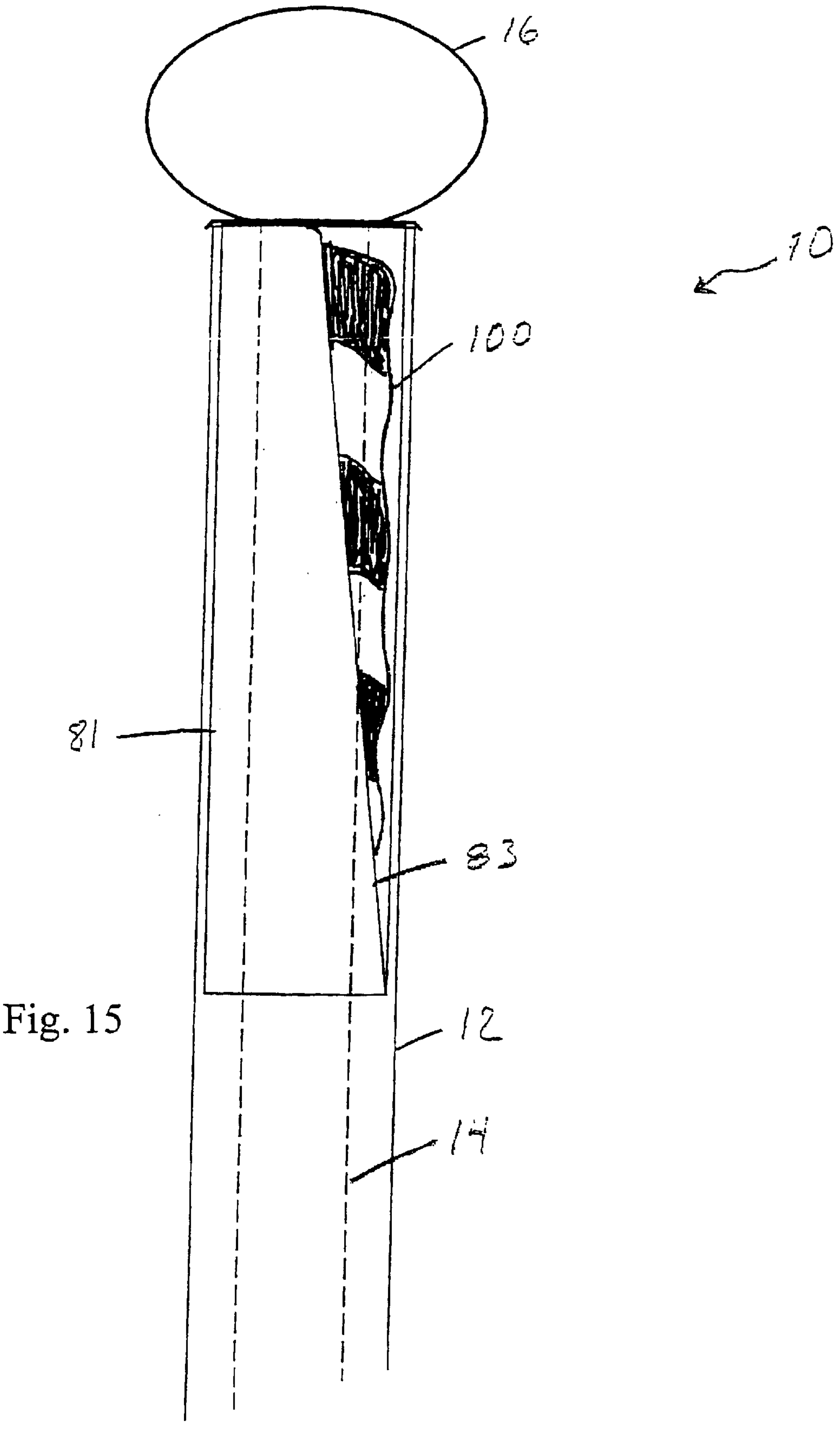
FIG. 15 is a cutaway elevational view of an alternative embodiment of the instant invention illustrating an alternative flag chamber system.
Figure 16:
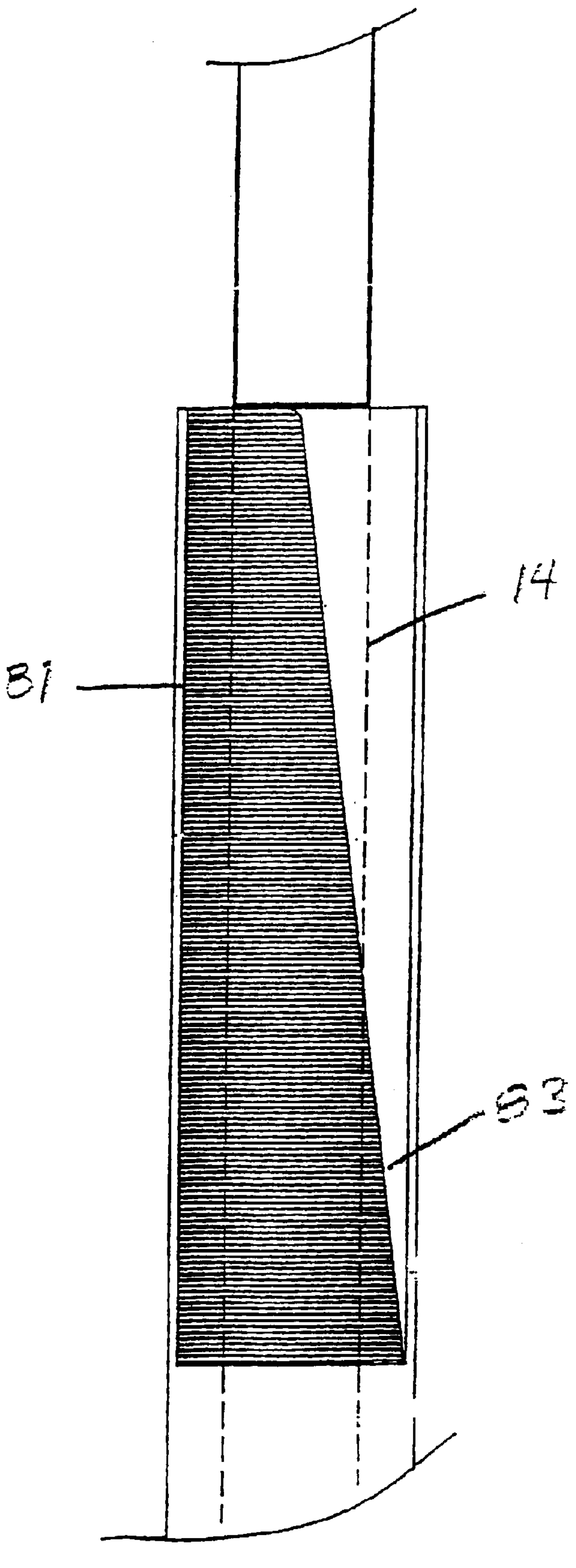
FIG. 16 is another cutaway elevational view of an alternative embodiment of the instant invention illustrating an alternative flag chamber system and piston.
Figure 17:
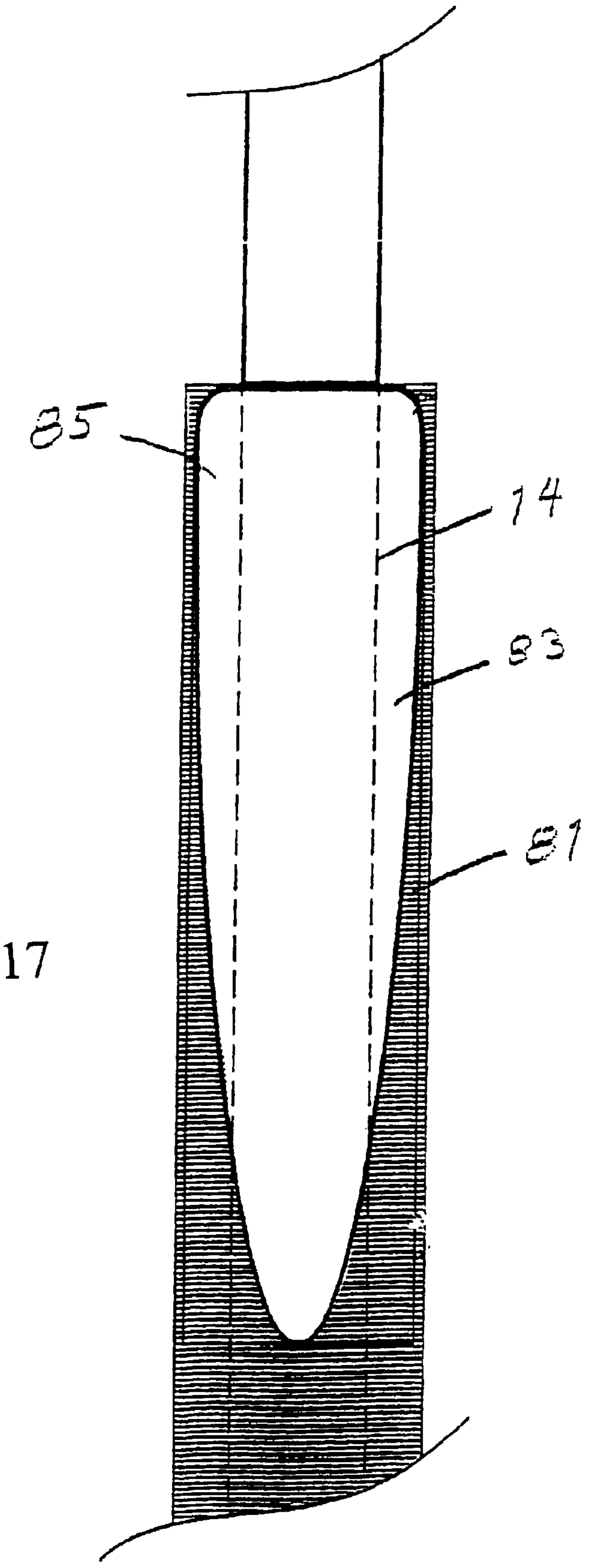
FIG. 17 is another cutaway elevational view of the alternative flag chamber system and piston illustrating the open side of the flag chamber in accordance with the instant invention.
Figure 18:
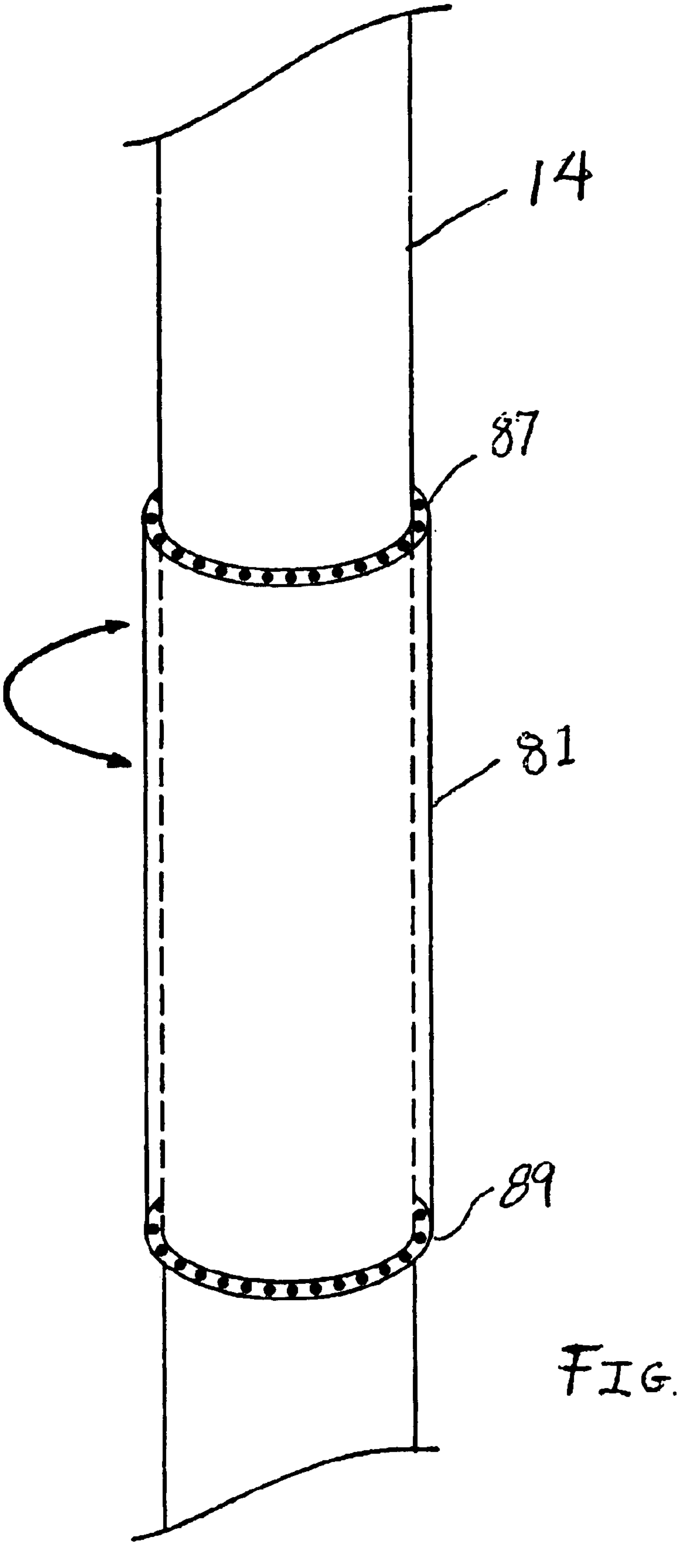
FIG. 18 is a perspective view of the piston in accordance with the instant invention.
Figure 19:
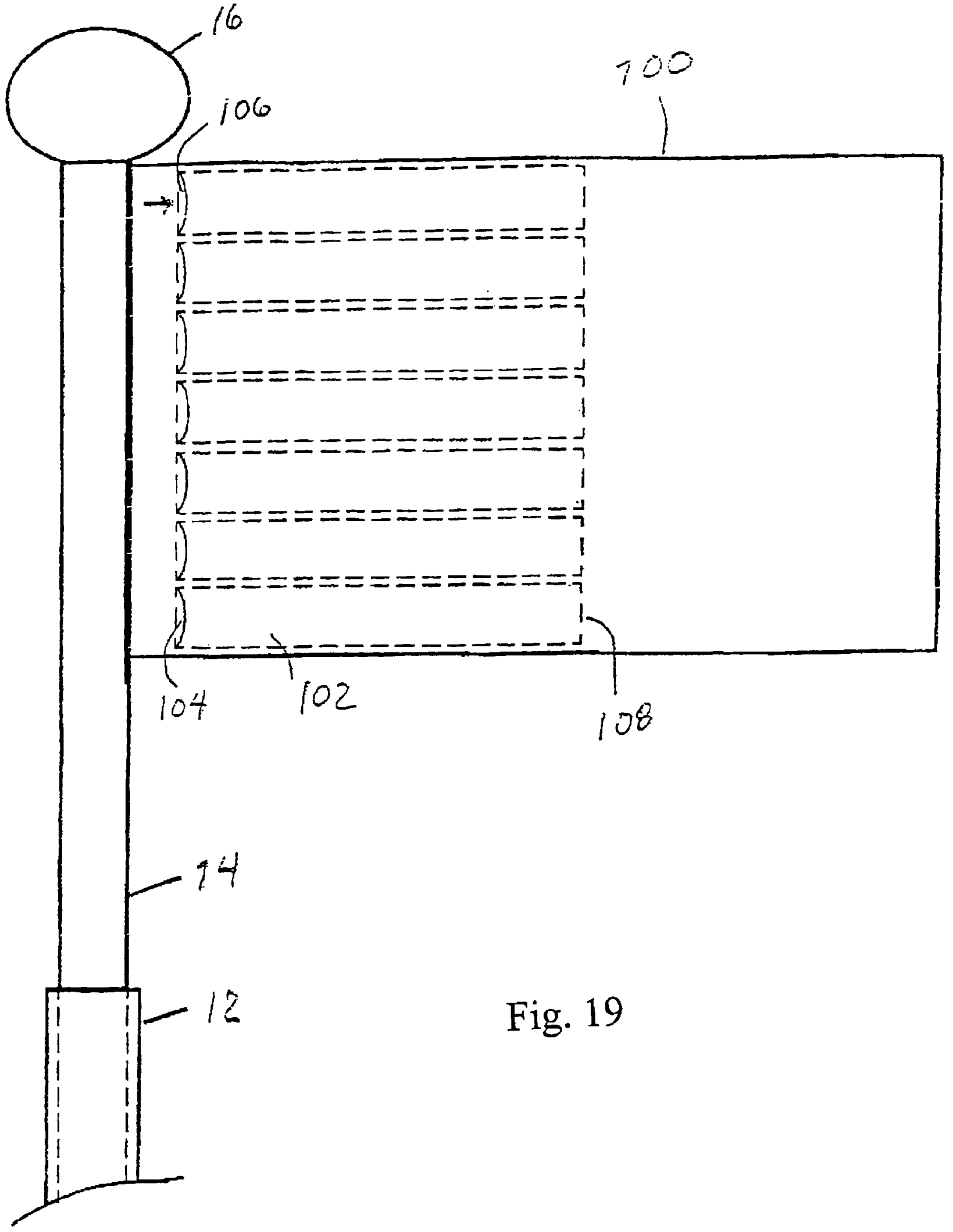
FIG. 19 is an elevational view of an alternative flag embodiment in accordance with the instant invention.

With reference to FIGS. 15 to 17, the flag chamber 83 is defined by an open void 85 between the inner pole and a flag piston 81, which provides a space for storing the flag 11 when the rotation mechanism is rotated. As shown in FIGS. 15–17, the flag chamber 83 has a diagonal truncated opening 85 that begins at or proximal the lower end of the chamber and diagonally cuts into the body of the flag chamber 83 as it approaches the mid-section of the upper end and tapers toward the lower end. The flag piston 81 is secured to the inner pole 14 inside the flag chamber 83. The flag piston 81 has at least one and preferably two bearings that engage the inside surface of the outer pole 12 for stability. With reference to FIG. 18, the piston 81 includes an upper nylon bearing 87 and a lower nylon bearing 89. When raising the flag 11, the piston 81 fills the void left in the empty flag chamber 83 or empties the flag chamber when lowering the flag. When the inner pole 14 is extended outside the outer pole 12, the flag 11 should open up. If the flag 11 does not open, it can be unraveled by actuating the handle 96 to rotate the inner pole 14. When opened, the inner pole 14 is free to rotate according to the wind direction thereby preventing the flag 11 from wrapping around the inner pole 14. When lowering the flag 11 and inner pole 14, the locking mechanism 78 insures that the flag is lowered in the appropriate position with respect to the outer pole 12. In the lowered position, the flag 11 is rolled into the flag chamber 83 by rotating the inner pole 14 clockwise or counterclockwise with the rotating mechanism.

With reference to FIG. 18, the instant invention 10 further comprises a unique flag 100 that is designed to be more durable than conventional flags. Conventional flags tend to flap erratically, especially in heavy winds, and often wrap around the pole. This tends to shorten the life of the flag. The modified flag 100 is designed to reduce erratic flapping and wrapping around the pole. The modified flag 100 comprises a plurality of open-ended wind channels 104, such as seven, formed by the flag material or curved panels 102. The panels 102 and channels 104 are formed on one surface of the flag 100 preferably on or proximal the flag pole side. The wind input openings 106 of the channels 104 are positioned proximal the flag pole 14 side. The output openings 108 are at the opposite end and are smaller than the input openings 106. When the flag 100 is extended, wind enters the input openings 106 of the channels 104, travels substantially horizontally through the channels 104 and exits through the output openings 108. The air pressure in the channels 104 is greater than the ambient pressure causing the flag 100 to stiffen into an extended position. This not only creates an enhanced look to the flag, but causes the flag 100 to behave more calmly in windy conditions thus extending the life of the flag.

The instant invention 10 is designed to facilitate the exchange of parts and maintenance. For instance, the chain driven elevator system 70 or parts thereof may be removed for use on other flag pole systems 10.

The instant invention has been shown and described herein in what is considered to be the most practical and preferred embodiment. It is recognized, however, that departures may be made therefrom within the scope of the invention and that obvious structural and/or functional modifications will occur to a person skilled in the art.

What is claimed is:

1. A flag refraction and extension system for extending and retracting a flag, said system comprising:

an elongated outer pole;

a flag chamber at least partially defined by said outer pole for receiving and storing the flag, said flag chamber comprising a diagonally truncated opening that angles inward toward an upper end for receiving and guiding the flag into said flag chamber;

an elongated inner pole slidably and rotatably disposed in said outer pole and adapted for attaching the flag;

flag retracting means, in mechanical communication with said inner pole, for rotating said inner pole to facilitate retracting the flag into said flag chamber; and means, at least partially disposed in said outer pole, for raising and lowering said inner pole with respect to said outer pole for extending and retracting the flag.

2. A system as recited in claim 1, further comprising a flag being attachable to said inner pole.

3. A system as recited in claim 1, further comprising means for adjusting the angle and height of said outer pole.

4. A system as recited in claim 1, further comprising means for stabilizing said inner pole within said outer pole to alleviate rocking of said inner pole when it is being raised and lowered and when the flag causes it to rotate in winding conditions.

5. A system as recited in claim 4, wherein said means for stabilizing said inner pole comprises:

a piston mounted to said inner pole for filling said flag chamber and stabilizing said inner pole when the flag is extended.

6. A system as recited in claim 5, wherein said means for stabilizing said inner pole further comprises:

bearing means, projecting outward from said inner pole, for bridging a gap between said inner pole and said outer pole.

7. A system as recited in claim 1, wherein said flag retracting means is at least partially disposed in said inner pole.

8. A system as recited in claim 1, wherein said flag retracting means comprises:

a drive shaft slidably disposed in said inner pole and adapted for causing said inner pole to rotate when said drive shaft is rotated; and means for rotating said drive shaft.

9. A system as recited in claim 8, wherein said for rotating comprises:

at least one gear connected to said drive shaft and a handle for rotating said gear.

10. A system as recited in claim 9, wherein said means for rotating further comprises:

a second gear in mechanical communication with said first gear and said handle, said second gear transferring rotational movement of said handle to said inner pole.

11. A system as recited in claim 8, wherein said means for rotating comprises:

a handle;

a first gear in mechanical communication with said handle; and a second gear in mechanical communication with said first gear and said drive shaft, said second gear transferring rotational movement of said handle and said first gear to said inner pole.

12. A system as recited in claim 1, wherein said means for raising and lowering said inner pole raises said inner pole a height sufficient to clear the flag from said outer pole.

13. A system as recited in claim 1, wherein said means for raising and lowering said inner pole comprises:

a first gear;

a second gear;

cam means, engaged with said inner pole, for moving the inner pole up and down;

means, movably wrapped around said first and second gears, for moving said cam when actuated.

14. A system as recited in claim 13, wherein said means for raising and lowering said inner pole comprises:

means for retaining said inner pole at a desired height.

15. A system as recited in claim 1, wherein said means for raising and lowering said inner pole comprises:

a support bearing in mechanical communication with said inner pole for supporting and urging movement of said inner pole.

16. A system as recited in claim 1, wherein said flag guide means comprises a piston affixed to an inner surface of said outer pole and having a tapered slot for facilitating the guidance of said flag guide into said flag chamber; wherein said slot being longer than the height of the flag being supported by said system.

17. A system as recited in claim 1, further comprising:

means at least partially disposed in said slot, for preventing the flag from being snagged when retracting, extending and rolling up the flag.

18. A system as recited in claim 1, further comprising:

means for electronically controlling said means for raising and lowering said inner pole, said means for rotating said inner pole, and said means for retracting.

* * * * *